United States Patent

Wray et al.

[15] 3,693,420
[45] Sept. 26, 1972

[54] COHESION TEST DEVICE

[72] Inventors: Paul E. Wray, 30 Stonehenge Lane, Chester, Pa. 19355; Stephen A. Howard, 265 Iven Avenue, Delaware, Pa. 19087

[22] Filed: June 1, 1971

[21] Appl. No.: 148,352

[52] U.S. Cl. ............................73/94, 73/81, 73/101
[51] Int. Cl. .........................G01n 3/42, G01n 3/24
[58] Field of Search..............73/60, 15.6, 81, 101, 87

[56] References Cited

UNITED STATES PATENTS 3,331,241   7/1967   Boonstra et al.................73/94

Primary Examiner—Richard C. Queisser
Assistant Examiner—Marvin Smollar
Attorney—Vito Victor Bellino, Andrew Kafko, Joseph Martin Weigman, D. E. Frankhouser and R. Wiser

[57] ABSTRACT

The disclosure is directed to a method and apparatus for measuring the cohesive forces in a tablet formed from compressed powders and is made up of a split die which has a cavity for the powders to be compressed, a cutting blade disposed between the two portions of the split die and extending outside the die, a cantilever beam connected at its free end to the extending end of the blade, reciprocating means connected to the other end of the cantilever beam to draw the blade through a compressed powder, while the compressed powder is still in the die cavity, and strain gauges connected to the cantilever beam to measure the amount of bending imparted to the cantilever beam by the resistance of the compressed powder to the movement of the blade. The cohesion forces thus determined may be used to predict the tableting characteristics of the material.

4 Claims, 4 Drawing Figures

PATENTED SEP 26 1972　　　　　　　　　　　　　　　　　　　　3,693,420

COHESION TEST DEVICE

The invention comprises a device and a method for measuring the particle-to-particle cohesion forces in powders or powdered mixtures under varying compression forces. The device comprises a die in which the powders may be compressed, a movable cutting blade fitted between the portions of the split die, and means to draw the cutting blade through the compressed powders. The cohesive character of a powder or powdered mixture being investigated is determined by compressing a weighed quantity of the powdered substance at a pre-determined force, and then applying sufficient force to the movable cutter blade so as to cut the compressed compacted powder in situ in a plane parallel to the faces of the compacted tablet. The force to move the blade may be determined by connecting the blade to the free end of a cantilever beam which is supported from a reciprocating means to move the beam and the attached blade backward and forward in the die. Strain gauges attached to the beam measure the stresses applied to the beam and, as is well known in the art, may be used with associated circuitry and meters to give a direct reading of the amount of the force causing the stress.

Cohesion is defined as the particle-to-particle attractive forces which result from individual material characteristics being compressed as a function of the force at which they are compressed. The amount of force required to move the blade through the compressed powders is a direct measure of cohesion. The cohesion forces thus determined may be related to various pharmaceutical properties for the material being tested such as powder flow, tableting characteristics, and encapsulating characteristics.

Prior to the discovery of the present invention, the only method of approximating cohesive character of powders was to evaluate the properties of finished tablets prepared from the powders. Typically this was done by measuring the force required to crush the tablet. The property thus determined is known in the art as "tablet hardness." Tablets were subjected to "hardness tests" which determined the magnitude of force required to either crush or break the tablet. The hardness test, of necessity, was performed on finished tablets and is both imprecise in character and lacks the capability of being correlated with tableting characteristics. The "hardness test" is imprecise and not indicative of the true cohesive nature of a material because the tablet to be tested must be ejected from the die and this imparts to the tablet stresses which affect the hardness measurement made on the tablet. In addition the removal of the tablet from the die permits the tablet to relax or undergo elastic rebound, thereby creating further stresses in the tablet which perturb the hardness values obtained.

In addition to the foregoing inherent inadequacies of the hardness test, the other major disadvantage is that the test must be performed on an intact tablet which would be crushed to obtain a "hardness measurement." The crushing of the tablet is affected by many properties of the tablet not relating to the cohesiveness of the material in the tablet. The tablet size, shape, weight, thickness and the like are all factors which will affect the apparent hardness value and are not related to the true cohesive character of the material under test. The inadequacies make it improbable that hardness measurements will correlate with the tableting characteristics of the materials tested.

Moreover there was no known way of measuring the cohesive forces of powders unless one would be willing to accept the assumption that "hardness" is a measurement of cohesiveness, but again to determine hardness the material must form a manageable tablet.

There is no prior art known that specifically describes the device of this invention. The following references describe the prior art:

1. Raff, A. M., A Study of Pharmaceutical Compressed Tablets: Factors Affecting Cohesive Properties, Doctoral Dissertation, Temple University, 1964.
2. Smith A. N., Pharm. J., 163, 194 (1949).
3. Shafer, G. E., Wallish, E. G., and Engle, C. E., J. Am. Pharm. Assoc., Sci. Ed., 45, (1956).
4. Smith A. N., Pharm. J., 163, 227 (1949).
5. Smith A. N., ibid., 163, 477 (1949).
6. Fuks, Z., Vojnosanit. Pregled., 14, 767 (1957).
7. Smith, A. N., Pharm. J., 164, 73 (1950).
8. Smith, A. N., ibid., 164, 132 (1950).
9. Raff, A. M., Arambulo, A. S., Perkins, A. J., and Deardorff, D. L., J. Am. Pharm. Assoc.,Sci. Ed., 44, 290 (1955).
10. Endicott, C. J., Lowenthal, W., and Gross, H. M., J. Pharm. Sci., 50, 343 (1961).
11. Fairchild, H. J., and Michel, F., J. Pharm. Sci., 50, 966 (1961).
12. Nelson, E., J. Am. Pharm. Assoc., Sci. Ed., 45, 354 (1956).

The present invention differs from the prior art particularly as described in the articles above. The techniques and devices used to date for the purpose of determining tablet cohesiveness generally apply crushing or attrition type measurements which must then be related to cohesiveness rather than directly measuring cohesiveness. The present invention differs from the prior art in that the device can directly determine the particle-to-particle cohesion within a compressed tablet and thereby yield a measurement directly related to tableting characteristics. In addition, another advantage is that the tablet may be tested in situ in a die thus making it possible to measure the cohesion characteristics of a substance that does not form manageable compacts. Furthermore the cohesion value obtained from single substances can be used to predict cohesion characteristics of mixtures of these substances and thereby permit tablet formulation on a quantitative basis rather than a qualitative basis.

It is an object of the present invention to provide a new method for directly measuring cohesion in compressed powders.

It is another object of the present invention to provide an apparatus for directly measuring cohesion in compressed powders.

It is a further object of this invention to provide a device for measuring in situ the particle-to-particle cohesion forces in a compressed powder.

It is still another object of the present invention to provide a method and apparatus for measuring the cohesive forces in non-tabletable powders.

It is still another object of this invention to provide a method and apparatus for measuring cohesive forces in compressed powders free from inaccuracies due to the shape, size, weight, thickness and the like of the compresses material.

It is yet another object of this invention to provide an apparatus and method for predicting the cohesion characteristics of a single substance that does not form manageable compacts.

Other and further objects of the invention will be apparent to those skilled in the art from a review of the following description taken in conjunction with the drawings in which.

Figure 1:
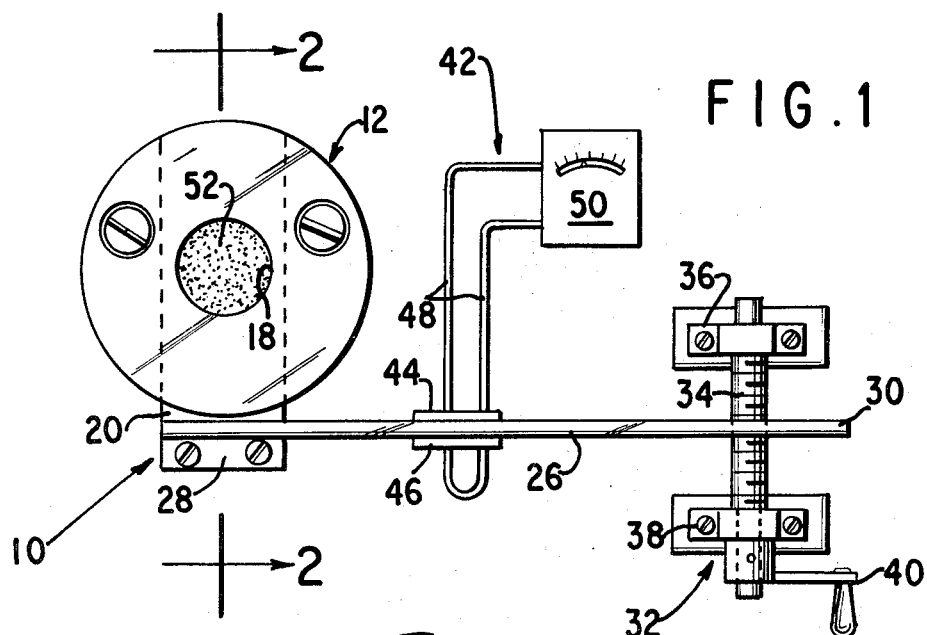
FIG. 1 is a plan view of the apparatus used for making measurements in the practice of the present invention.
Figure 2:
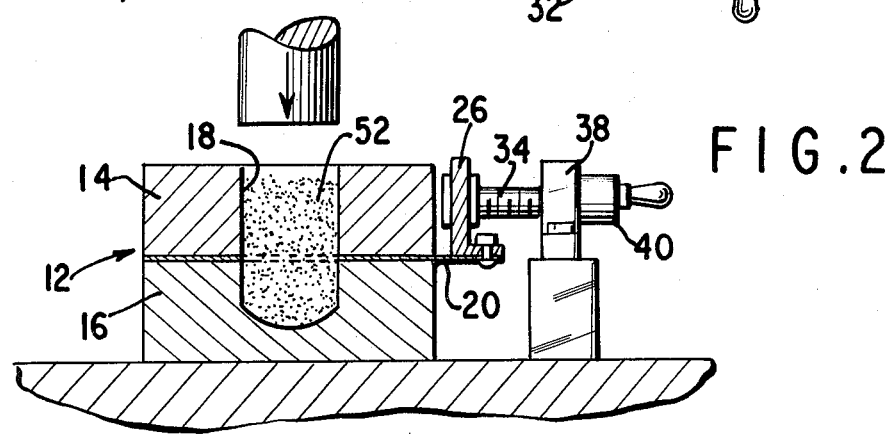
FIG. 2 is a sectional view taken generally along lines 2—2 of FIG. 1.
Figure 3:
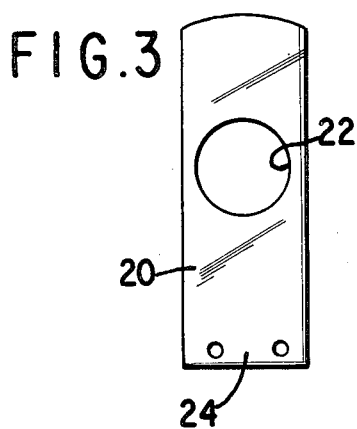
FIG. 3 is a plan view of one embodiment of the cutter blade useful in the practice of the present invention.

The preferred embodiment of the invention is shown in the drawings in which the cohesion measuring device shown generally at 10 is comprised generally of a split die 12 comprised of upper portion 14 and lower portion 16 and has a cavity 18 adapted to contain powders for compression. A cutter blade 20 is disposed between the upper and lower portions of the die and has an orifice 22 corresponding in shape and size to the cavity in the die. Thus the cutting edges may be described as blunt because they preferably define a continuous surface in conjunction with the wall of the cavity in the die. At one end of the cutter blade 20 is a mounting segment 24 which is adapted to be connected to a cantilever beam 26, for instance by an adhesive or by connectors such as bolts and nuts, at an end portion 28 of the cantilever beam 26. Near its opposite end portion 30 the cantilever beam is supported by reciprocating apparatus 32 for moving the beam backwards and forwards relative to the die and so moving the cutter blade 20 backwards or forwards within the die. In the preferred embodiment the reciprocating means 32 is comprised of a helically threaded shaft 32 which is supported in pillow blocks 36 and 38. A crank handle 40 is connected to one end of the helically threaded shaft 34. The pillow blocks are immovably fastened to a base plate, not shown, so that rotation of the handle 40 causes the cantilever beam 26 to be moved backwards and forwards in the direction of the arrow depending on the direction of the rotation of the handle.

A stress measuring means 42 is comprised of strain gauges 44 and 46, which may be piezo-electric crystals, which are firmly connected to the cantilever beam, for instance by an adhesive, electrical conductors 48 connected between the strain gauges 44 and 46, and well-known circuitry shown as block 50 which as is well known in the art, may contain means for converting the electrical signal from the strain gauges into a meter deflection. The meter may be calibrated directly in units of force so that the cohesion of a powder 52 being tested may be read directly.

In operation the reciprocating means is used to position the orifice 22 of the cutter blade in alignment with the cavity 18 of the split die 12. A predetermined weight of the powder 52 to be tested is charged into the cavity 18 and a predetermined force is applied by means well known in the art to compress the substance. After compression any residual compressive force may be removed, if desired, as long as the compressed powder is restrained within the die. After compression, the handle 40 of the reciprocating means is rotated in order to move the cantilever beam 26 and the cutter blade 20 so that the orifice of the cutter blade passes through the compressed powder 52. The force necessary to move the cutter blade 20 causes the cantilever beam 26 to bend. The amount of deflection of the cantilever beam is detected by the strain gauges 44 and 46 and converted into a measurement directly related to force by the associated circuitry.

Figure 4:
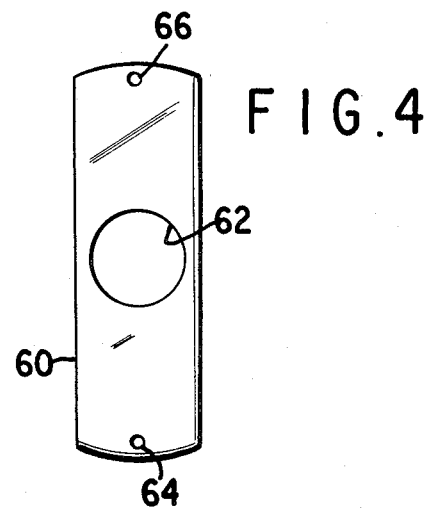
FIG. 4 is a plan view of an alternate embodiment of a cutter blade useful in the practice of the present invention.

An alternate embodiment of the cutter blade is shown in FIG. 4. The cutter blade 60 has an orifice 62 corresponding to the cavity 18 of the split die 12. The cutter blade 60 has orifices 64, 66 at opposite ends to which a force measuring device may be attached, for instance by connectors such as bolts and nuts or by a simple hook. If desired an ordinary spring loaded, calibrated scale, not shown, may be attached to either of the orifices 64, 66 and while hand held used to pull the cutter blade 60 through the compressed powder. The force used may be read directly from the scale. The cutter blade may be repositioned by a hook device attached to the other of the orifices 64, 66.

What is claimed is:

1. Apparatus for measuring the cohesive forces in a compressed powder comprising:
   A. A split tablet die having a cavity for powder;
   B. A blade disposed between the two portions of said die and extending outside; and
   C. Force measuring means connected to said blade and adapted to move said blade through a compressed powder.

2. Apparatus as defined in claim 1 wherein said force measuring means is a spring loaded scale.

3. Apparatus as defined in claim 1 further comprising:
   D. A cantilever beam connected at its free end to said extending end of said blade;
   E. Reciprocating means connected to the other end of said beam and adapted to move said blade relative to said die; and
   F. A stress measuring means connected to said beam between said blade and said reciprocating means.

4. An apparatus as defined in claim 1 wherein said stress measuring means comprises strain gauges and associated circuitry.

* * * * *

PO-1050
(5/69)

UNITED STATES PATENT OFFICE
CERTIFICATE OF CORRECTION

Patent No. 3,693,420     Dated September 26, 1972

Inventor(s) Paul E. Wray and Stephen A. Howard

It is certified that error appears in the above-identified patent and that said Letters Patent are hereby corrected as shown below:

Add to page 1 after paragraph [72]:

[73] Assignee:

American Home Products Corporation
    New York, New York

Signed and sealed this 17th day of April 1973.

(SEAL)
Attest:

EDWARD M. FLETCHER, JR.
Attesting Officer

ROBERT GOTTSCHALK
Commissioner of Patents